June 30, 1970 J. A. COPELAND III 3,518,545

METHODS AND APPARATUS FOR MEASURING SEMICONDUCTOR DOPING PROFILES BY DETERMINING SECOND HARMONIC CONTENT

Filed April 25, 1968 2 Sheets-Sheet 1

INVENTOR
J. A. COPELAND III

BY

Roderick B. Anderson
ATTORNEY

United States Patent Office 3,518,545

Patented June 30, 1970

3,518,545

METHODS AND APPARATUS FOR MEASURING SEMICONDUCTOR DOPING PROFILES BY DETERMINING SECOND HARMONIC CONTENT

John A. Copeland III, Gillette, N.J., assignor to Bell Telephone Laboratories, Incorporated, Murray Hill and Berkeley Heights, N.J., a corporation of New York Filed Apr. 25, 1968, Ser. No. 724,169
Int. Cl. G01r 31/26
U.S. Cl. 324—158 24 Claims

ABSTRACT OF THE DISCLOSURE

The doping profile of a semiconductor wafer is measured by forming a diode on one surface of the wafer, reverse-biasing the diode, directing A-C current through the diode, and measuring first and second harmonic frequency voltages across the diode. Circuitry is also disclosed for maintaining a substantially constant A-C current through the diode.

BACKGROUND OF THE INVENTION

This invention relates to the measurement of doping density profiles of semiconductor wafers.

An important step in the fabrication of semi-conductor devices is the incorporation of a controlled impurity density into the semiconductor wafer from which the devices are to be made. The process of introducing such impurities is called doping, and the most common technique for accomplishing this is impurity diffusion. The impurity concentration, or doping density, determines the conductivity of the wafer and is therefore one of the most significant parameters of the finished devices. Because diffusion typically results in a non-uniform distribution of impurities, it is often important to determine the doping density profile, or impurity distribution, in the wafer.

As is known, this can be done by first bonding a small metal layer to a top surface of the semiconductor wafer to form a Schottky barrier diode. A varying reverse-bias voltage is applied across the diode and the capacitance of the diode is measured as a function of bias voltage. The doping density profile is related by a known expression to the capacitance and to the rate of change of capacitance with respect to voltage and is therefore determinable. However, the technique requires computation, either manually or by a computer, before the final result is obtained, and is limited in resolution and numerical accuracy by the necessity of interpolating between two points to find the rate of change of capacitance with respect to voltage.

SUMMARY OF THE INVENTION

My invention is predicated on the discovery that if alternating current of frequency $f$ is directed through a reverse-biased semiconductor diode, and an output alternating voltage is derived from the diode, the amplitude of the output voltage at the fundamental or first harmonic frequency $f$ will be proportional to the depth of the semiconductor depletion layer, and the amplitude of the voltage at the second harmonic frequency $2f$ will be proportional to the reciprocal of the doping density at the edge of the depletion layer.

The depletion layer is a region of the semiconductor that has been depleted of majority carriers as a result of reverse-bias voltage across an electronic barrier. The electronic barrier of the diode may be a Schottky barrier, a capacitive contact, or a p-n junction.

In accordance with one illustrative embodiment, the doping profile of the semiconductor wafer is determined by first bonding a metal layer to one surface of the wafer to form a Schottky barrier diode. The diode is reverse-biased and a substantially constant current of frequency $f$ is directed through the diode. Output voltages of frequencies $f$ and $2f$ are derived from the diode and are used to drive an X–Y plotter which is calibrated to record the amplitude of the first harmonic voltage in terms of depletion layer depth and to record the second harmonic voltage in terms of the reciprocal of doping density at the edge of the depletion layer.

The reverse-bias voltage is then increased either automatically or manually to increase the thickness of the depletion layer. As the bias voltage is changed, the plotter records the reciprocal of the doping density as a function of depletion layer depth. Since the edge of the depletion layer scans the thickness of the wafer, the recorder indicates doping density as a progressive function of distance from the wafer surface.

This technique is much easier to practice than the conventional process because no computations need be made after each bias-voltage change. While the conventional process may incorporate the use of a computer and other apparatus for minimizing manual effort, such apparatus is much more expensive than that required by my technique. Moreover, my technique gives a continuous or "real-time" indication of doping density with respect to distance; hence, any anomalous read-out, such as that caused by a poor contact and the like, can be quickly detected. Finally, it can be shown that the distance error in my technique is limited only by the Debye length of the wafer in most cases, and that it therefore is capable of higher resolution and greater accuracy.

For the most straightforward operation of the apparatus, the A-C current through the apparatus should be substantially constant. This can be accomplished by making the input impedance to the diode at the fundamental frequency much higher than the maximum diode impedance. Moreover, the A-C voltages developed across the diode at the fundamental and second harmonic frequencies should be measured while drawing so little current as to avoid appreciable voltage drops across the diode. This is best done by making the impedance seen by the diode much higher than its own impedance at both frequencies, through the use of appropriate circuitry as will be described later.

DRAWING DESCRIPTION

These and other objects, features and advantages of the invention will be better understood from the following detailed description taken in conjunction with the following drawing, in which.

DETAILED DESCRIPTION

Figure 1:
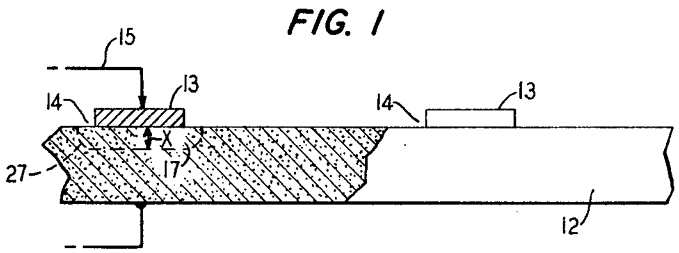
FIG. 1 illustrates one step in a process for measuring the doping density profile of a semiconductor wafer.

Referring now to FIG. 1, there is shown a semiconductor wafer 12 which has been impregnated or doped with an impurity as one step in a semiconductor device fabrication process. It is useful, and in many cases necessary, to determine the doping density profile of the wafer, or in other words the change of impurity concentration with respect to wafer depth, in order to control the quality of the finished devices or to predict their electrical characteristics. A conventional way of doing this is to bond an array of metal contacts 13 on an upper surface of the wafer such that each contact forms a Schottky barrier diode 14 with the wafer. Test probe 15 is then used to reverse-bias one of the Schottky barrier diodes to form a depletion layer 17 in the wafer. By changing the reverse-bias voltage and measuring the capacitance between the contact 13 and the wafer, and the rate of change of capacitance with reverse-bias voltage, it is possible to compute the doping density profile. As pointed out previously, this requires either laborious and time-consuming manual computation or expensive computer apparatus, and is inherently of only limited resolution; that is, changes of doping density with respect to small depth changes cannot be detected. As a practical matter the doping density profile cannot be plotted as the test is being made, and anomalous results caused by bad contacts and the like are not detected until the procedure has been completed.

In accordance with an illustrative embodiment of the invention, Schottky barrier diodes are first formed along an upper layer of the wafer as in the conventional process. The Schottky barrier diode 14 is included in the circuit of FIG. 2 and is reverse-biased by a variable D-C voltage source 19. A signal source 20 directs alternating current of frequency *f* through a resistor R and the diode. A radio frequency choke 21 and a capacitor 22 separate and isolate the A-C and D-C current paths. A first filter 24 connected to th diode derives from the diode a voltage at the fundamental or first harmonic frequency *f*, while a second filter 25 derives from the diode a second harmonic voltage at frequency 2*f*. These voltage amplitudes are preferably amplified and transmitted to an X–Y plotter 26 which plots the second harmonic voltage amplitudes as a function of the first harmonic voltage amplitude.

Figure 2:
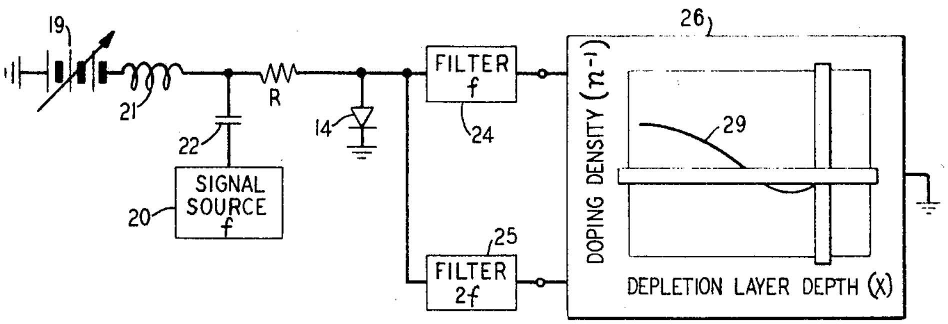
FIG. 2 is a schematic illustration of apparatus for measuring the doping density profile of a semiconductor wafer in accordance with an illustrative embodiment of the invention.

As is shown in the appendix to this specification, the voltage across the diode of FIG. 1 at the first harmonic frequency is directly proportional to the depletion layer depth X of the Schottky barrier diode; and the diode voltage at the second harmonic frequency 2*f* is inversely proportional to the doping density at the edge 27 of the diode depletion layer. Accordingly, the X–Y plotter 26 can be calibrated to record the first harmonic voltage in terms of depletion layer depth X and the second harmonic voltage in terms of the reciprocal of doping density ($n^{-1}$), as illustrated in FIG. 2. In particular, Equation 20 of the appendix describes the relationship of X and $n^{-1}$ to the recorded A-C voltages. The variable voltage source 19 is either manually or automatically varied to change the reverse-bias across the diode 14 and thereby vary the depth X of the depletion layer.

As the bias voltage is changed, the plotter 26 describes a trace 29 which constitutes the doping density profile of the wafer in the region defined by the Schottky barrier diode. It is preferable to start with a low bias voltage and then increase the bias voltage to increase the depletion layer depth X. This causes the depletion layer edge 27 to "sweep" through the wafer and gives a trace on the plotter showing the variation of doping density with increasing distance from the surface of the wafer.

As with the conventional technique, the reverse-bias voltage cannot exceed the avalanche breakdown voltage of the wafer. Since this limits the wafer depth through which the depletion layer may be swept, small areas of the wafer may be reduced in thickness to permit test diodes to be located at various depths within the wafer.

For optimum use of the process, the peak amplitude of the A-C current through the diode should preferably be substantially constant. This can be accomplished by making the impedance seen by the diode at frequencies *f* and

2*f* very high compared to its own impedance. This is illustratedin FIG. 3 in which the input circuit includes a constant current source I and input impedance $Z_I$, and the output circuit includes a load impedance $Z_L$. By making the impedances $Z_I$ and $Z_L$ infinite, or at least very high by comparison to the diode impedance, the current through the diode will be constant notwithstanding the voltages derived for measurement by the output circuit. Referring to FIG. 2 the resistance R and the impedances of filters 24 and 25 should be high by comparison to the impedance of the diode 14 to give a substantially constant current through the diode at frequency *f* and substantially zero current at frequency 2*f*.

Figure 4:
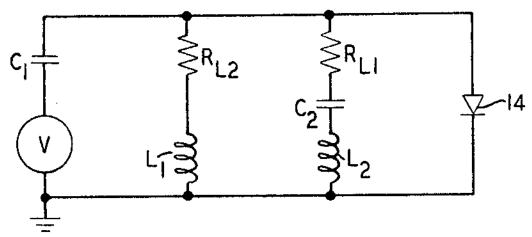
Figure 5:
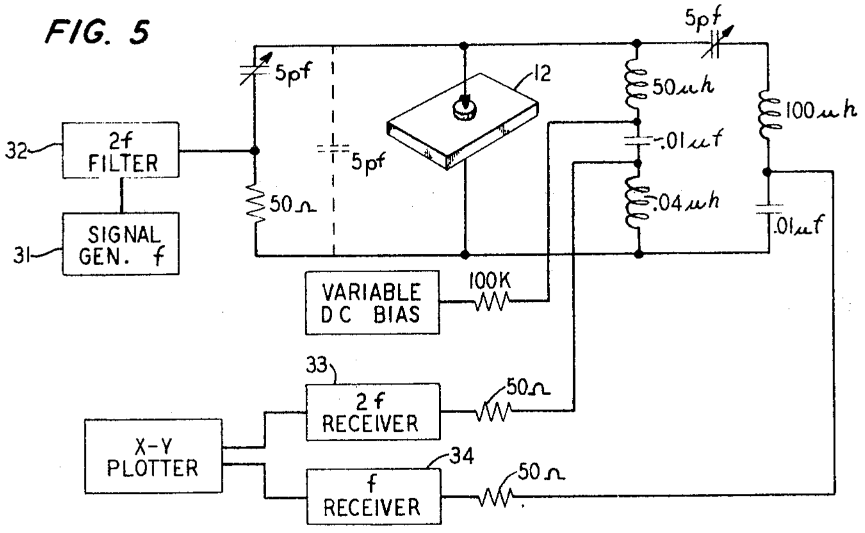
FIG. 5 is a more detailed circuit showing an illustrative implementation of the circuit of FIG. 2.

A circuit which has been built and which substantially meets these criteria is shown in FIG. 5, but it is best discussed with reference to its idealized equivalent circuit shown in FIG. 4. The simplified circuit which is seen by the diode 14 of FIG. 4 consists of the following elements in parallel: a constant A-C voltage source in series with a capacitor $C_1$, an inductor $L_1$ in series with a load $R_{L2}$, and an inductor $L_2$ in series with a capacitor $C_2$ and a load resistance $R_{L1}$. It is assumed that reistances $R_{L1}$ and $R_{L2}$ are zero. The impedance of this idealized circuit in complex notation is given by $$Z(\omega)=\frac{i(\omega L_2-1/\omega C_2)}{1-(\omega C_1-1/\omega L_1)(\omega L_2-1/\omega C_2)} \qquad (1)$$

$$\sqrt{-1}$$

where $i$ is equal $\sqrt{-1}$ and $\omega$ is the fundamental angular frequency $2\pi f$.

This idealized circuit has an infinite impedance at two frequencies, $\omega_1$ and $\omega_2$. The lower frequency $\omega_1$ is less than the smaller value of $(L_1C_1)^{-0.5}$ or $(L_2C_2)^{-0.5}$. The circuit should be designed to give infinite impedances at $\omega_1$ and $\omega_2$ where $\omega_2$ is equal to $2\omega_1$.

For the infinite impedance frequencies to have a ratio of 2 to 1 a necessary condition is that, $$\tfrac{1}{4}<L_1C_1/L_2C_2<4. \qquad (2)$$

An exact condition for $\omega_2$ being equal to $\omega_1$ can be found by reducing the denominator of Equation 1 to quadratic form in $\omega_2$, which leads to the condition, $$4(L_1C_2+L_1C_1+L_2C_2)^2-25L_1C_1L_2C_2=0 \qquad (3)$$

For, $\omega_1$, this is expressed as, $$\omega_1=(L_1C_1L_2C_2/4)^{1/4} \qquad (4)$$

Hence, by using an A-C source of frequency $\omega_1$ that complies with Equation 4, the diode in the ideal case sees an infinite impedance at frequencies *f* and 2*f*, where *f* equals $2\pi\omega_1$. In the real case, the impedance will be of some high value if the load resistances $R_{L1}$ and $R_{L2}$ are small compared to the impedance of the reactive elements $_{L1}$ and the combination of $C_2$ and $L_2$, respectively. Voltages at the first and second harmonic frequencies will appear across the load resistors $R_{L2}$ and $R_{L1}$ which are proportional to the voltages across the diode. The actual value of resistors $R_{L1}$ and $R_{L2}$ should not be high since their connection as shown is the equivalent of much higher value resistances connected directly across the diode.

In actual circuit which has been built using the circuit design of FIG. 4 is shown in FIG. 5. The signal generator 31 generated a 5 megahertz signal at 1 volt with a 50 ohm impedance, while a filter 32 was used to remove second harmonics at 10 megahertz.

The signal was directed through a Schottky barrier diode formed on a surface of the semiconductor wafer 12 by way of a conventional test probe. A short wave receiver 33 was tuned to 10 megaherts and detected the second harmonic voltage while a receiver 34 was tuned to 5 megahertz for detecting the first harmonic voltage. Fifty ohm transmission lines were used throughout, and the values of the various circuit components are indicated on the drawing. The letter K designates kilo-ohms, $\mu$f is microfarads, pf. is picofarads, $\mu$h is microhenries and $\Omega$ is ohms.

Figure 6:
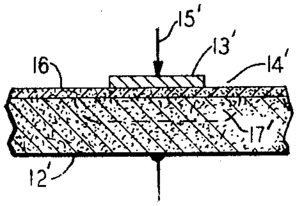
FIG. 6 illustrates an alternative step to that shown in FIG. 1.

The circuit of FIG. 6 substantially complies with Equation 4, and the specific solution of Equation 4 that was used was, $$L_1C_1=L_2C_2 \quad (5)$$

$$C_1=2C_2 \quad (6)$$

$$\omega_1=(2L_1C_1^{-0.5} \quad (7)$$

Because of the finite figure of merit Q of the coils and the necessity of lightly loading the circuit to excite it and to couple out enough power to monitor the fundamental and second harmonic voltages, the maximum impedance that can actually be reached is limited to, $$Z_{max}(\omega_1)=Q_1\omega_1L_1. \quad (8)$$

$$Z_{max}(\omega_2)=Q_2/\omega_2C_1 \quad (9)$$

where $Q_1$ and $Q_2$ are the over-all figures of merit at $\omega_1$ and $\omega_2$, respectively.

In the circuit of FIG. 5, the Q values of $L_1$ and $L_2$ were about 100, whereas the over-all Q was about 25 and the maximum impedance was about 75 kilo-ohms at both frequencies. The error caused by these finite impedances at the fundamental and second harmonic frequencies and the calibration adjustments that can be made therefor will be described in detail in the appendix.

The Schottky barrier diode shown in FIG. 1 can be made, for example, by evaporating gold though a vacuum onto n-type gallium arsenide. Good barrier contacts have also been made merely by putting a globule of molten gallium on a clean planar surface of gallium arsenide.

The present process can be used to evaluate any of the other generally used semiconductors, however, and any of the known methods for forming Schottky barriers on such semiconductors is consistent with the invention.

The Schottky barrier is only one example of an electronic barrier that can be formed on the surface of a semiconductor to permit reverse-biasing with accompanying depletion layer formation. Alternatively, as shown in FIG. 6, the electronic barrier may be a dielectric layer 16 upon which a contact 13′ is formed. The contact 13′, dielectric layer 16, and semiconductor 12′ together constitute a metal-insulator-semiconductor diode 14′ that can be reversed-biased to give a depletion layer 17′ as before. The diode 14′ can be used in the apparatus of FIGS. 1, 4 and 5 to give the same wafer evaluation as does the Schottky barrier diode.

Figure 7:
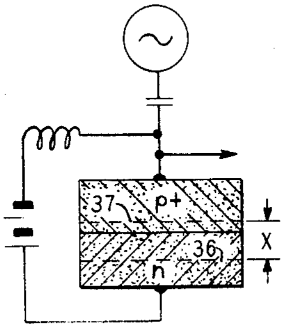
FIG. 7 shows one step in measuring the doping density profile of a p-n junction diode in accordance with another embodiment of the invention.

As illustrated in FIG. 7, the present technique can also be used for plotting the doping profile in a p-n junction device. In this case, however, the first harmonic voltage is directly proportional to the width X of the depletion layer in both the p- and n-type regions and the second harmonic voltage is proportional to the doping densities $(n^{-1}+p^{-1})$ at the edges 36 and 37 of the depletion layer opposite the p-type region. As before, the reverse-bias on the diode can be changed so that the edge 36 sweeps through the $n$ conductivity region.

Very often the conductivity on one side of the p-n junction is much higher than that on the other side, and to illustrate this, the p side of the junction device of FIG. 7 is labeled $p^+$ to indicate a high p-type conductivity. If this is true, the depletion layer will extend only a negligible distance into the p-type side and the distance X can be taken as the distance between the junction and the depletion layer edge 36. Moreover, the reciprocal of the p-type doping density $p^{-1}$ is negligible with respect to the reciprocal of doping density in the n region, $n^{-1}$, and the doping density profile of the n-type region can be plotted in the same manner as in the Schottky barrier diode version. Notice that in a Schottky barrier diode, the conductivity of the metal layer is exceedingly high with respect to the conductivity of the wafer.

Figure 3:
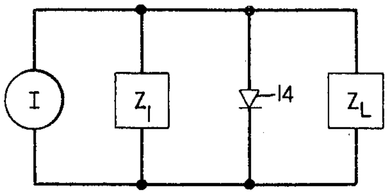
FIGS. 3 and 4 are equivalent idealized circuits which are included to illustrate preferred circuit parameters in a circuit of the type shown in FIG. 2.

In summary, the circuit of FIG. 2 illustrates the basic principles of the invention which are readily applicable in determining the doping density profile in a semiconductor wafer as shown in FIG. 1. FIG. 3 illustrates the function of maintaining a constant A-C current through the diode, while FIG. 4 is an idealized circuit for accomplishing this function. FIG. 5 is a circuit which has actually been built which approximates the idealized circuit of FIG. 4.

Circuits other than those described can be used for determining the doping density profile in accordance with the invention. Moreover, in the circuit of FIG. 2 an analog divider circuit may be connected between the filter 25 and the X–Y plotter 26 to generate the reciprocal of the second harmonic voltage which would permit the doping density n to be recorded directly, rather than the reciprocal of the doping density $n^{-1}$.

The apparatus which has been described has the advantages of simplicity, immediate results and economy. Also, the resolution is higher than in prior devices and in most cases is limited only by the Debye length of the semiconductor.

The examples which have been described are intended merely to be illustrative of the inventive concept. Various other embodiments and modifications may be made by those skilled in the art without departing from the spirit and scope of the invention.

APPENDIX

The voltage V across the depletion layer under the Schottky-barrier contact as a function of charge per unit area Q is given by $$V(Q)=\int_0^{X(Q)} E(x, Q)\,dx \quad (10)$$

where the depth of the depletion layer X(Q) is found by solving $$Q=e\int_0^{X(Q)} n(x)\,dx \quad (11)$$

where $e$ is the electron's charge and $n(x)$ is the net donor density. The electric field $E(x, Q)$ is given for $x$ being less than X(Q) by $$E(x, Q)=\frac{Q}{\epsilon}-\frac{e}{\epsilon}\int_0^x n(x)\,dx \quad (12)$$

where $\epsilon$ is the permittivity ($1.11\times10^{-12}$ fd./cm. for GaAs).

If the charge per unit area Q is increased by a small increment $\Delta Q$, then the voltage changes by an increment $\Delta V$ given by $$\Delta V=\int_0^{X(Q)} [E(x, Q+\Delta Q)-E(x, Q)]dx + \int_{X(Q)}^{X(Q+\Delta Q)} E(x, Q+\Delta Q)\,dx \quad (13)$$

$$\Delta V=\frac{\Delta Q.X(Q)}{\epsilon}+\frac{e}{\epsilon}\int_{X(Q)}^{X(Q+\Delta Q)}\int_x^{X(Q+\Delta Q)} n(x')\,dx'\,dx \quad (14)$$

If $\Delta Q$ is small enough so that $n(x)$ may be considered equal to $n$(X) between X(Q) and $X(Q+\Delta Q)$, then (11) can be written $$\Delta V=\frac{\Delta Q.X(Q)}{\epsilon}+\frac{n(X)e[X(Q+\Delta Q)-X(Q)]^2}{2\epsilon} \quad (15)$$

From (12)

$$\Delta Q=e\int_{X(Q)}^{X(Q+\Delta Q)} n(x)\,dx \quad (16)$$

$$\doteqdot n(X)e[X(Q+\Delta Q)-X(Q)] \quad (17)$$

So (15) becomes $$\Delta V=\frac{\Delta Q.X}{\epsilon}+\frac{\Delta Q^2}{2e\epsilon n(X)} \quad (18)$$

If ΔQ is the incremental charge due to an A-C current, I sin ($\omega t$), then $$\Delta Q=\frac{I\cos(\omega t)}{\omega A} \quad (19)$$

where A is the diode's surface area and $\omega$ is the angular frequency of the driving current. Now $$\Delta V=\left[\frac{I\cos(\omega t)}{\omega\epsilon A}\right]X-\left[\frac{I^2\cos(2\omega t)+1}{4\omega^2 e\epsilon A^2}\right]n(X) \quad (20)$$

This is the final form. The first term on the left is the incremental voltage with the same frequency as the driving current which has an amplitude proportional to the depth of the depletion layer, X. The second term is the incremental voltage at twice the frequency of the driving current and this amplitude is proportional to the reciprocal of the net donor density at depth X $1/n(X)$. As mentioned before, this equation can be used to calibrate the plotter of FIGS. 1 and 5. While the notation $n$ connotes donor density in an n-type material, the technique applies equally well to p-type material.

If the diode sees finite impedances at the fundamental and second harmonic, $Z_1$ and $Z_2$, an apparent value of depletion layer depth $X_a$, is observed which is related to the true value X by $$X_a=X[|1-iX/\omega_1\epsilon AZ_1|]^{-1} \quad (21)$$

If $Z_1$ is resistive and equal to $R_1$, then $$X_a=X[1+(X/\omega_1\epsilon AR_1)^2]^{-0.5} \quad (22)$$

Also the apparent value of the doping density reciprocal $n_a^{-1}$, is related to true value by $$n_a^{-1}=n^{-1}[X^2/X^2(1-iX/\omega_2\epsilon AZ_2)] \quad (23)$$

If $Z_2$ is resistive and equal to $R_2$, then $$n_a^{-1}=n^{-1}[X_a^2/X^2][(1-(X/\omega_2\epsilon AR_2)^2]^{-0.5} \quad (24)$$

As can be seen from (21) through (24), if impedance at $\omega_1$ and $\omega_2$ is resistive, the errors are of order $X^2$, whereas a reactive part of $Z_1$ or $Z_2$ will introduce an error of order X which can be more serious.

The assumption has been made that the doping $n$ is in a wafer whose surface is normal to the direction of epitaxial growth or where the doping is due to diffusion of dopant from the substrate surface. The uniformity in the directions parallel to the surface may be checked by examining adjacent diodes. The size of the diodes is limited by the minimum capacity (maximum impedance) the circuit can tolerate. Also, the resolution in the normal direction is limited by thermal diffusion to about two Debye lengths. Approximate minimum values of diode diameter and depth resolution are shown in Table 1.

TABLE 1.—APPROXIMATE LIMITS FOR UNIFORMLY DOPED COMMON SEMICONDUCTORS

| Doping density (cm.$^{-3}$) | Maximum depth (μm.) | Maximum D-C volts | Depth resolution (2 debye lengths) (μm.) | Minimum diode diameter to keep C>1 pf. at maximum depth (mils) |
|---|---|---|---|---|
| $10^{14}$ | 80 | 500 | 1.00 | 40 |
| $10^{15}$ | 12 | 100 | 0.30 | 15 |
| $10^{16}$ | 2 | 20 | 0.10 | 7 |
| $10^{17}$ | 0.3 | 4 | 0.03 | 2 |

What is claimed is:

1. In a process for evaluating a semiconductor wafer having an electronic barrier diode region, the steps of:
applying a reverse bias voltage across the diode region, thereby establishing a depletion layer;
applying alternating current of frequency $f$ to the diode region;
deriving a second harmonic voltage of frequency $2f$ from the diode region;
and determining the doping density at an edge of the depletion layer comprising the step of measuring the amplitude of the second harmonic voltage, said amplitude being indicative of the doping density at an edge of the depletion layer.

2. The process of claim 1 further comprising the steps of:
deriving a first harmonic voltage of frequency $f$ from the diode region;
and determining the thickness of the depletion layer comprising the step of measuring the amplitude of the first harmonic voltage, said amplitude being indicative of the thickness of the depletion layer.

3. The process of claim 2 further comprising the steps of:
changing the bias voltage across the diode region, thereby varying the thickness of the depletion layer;
and successively deriving and measuring first and second harmonic voltages, thereby giving indications of successive depletion layer thickness and doping density at different depths in the wafer.

4. The process for measuring the doping density in a semiconductor wafer comprising the steps of:
forming an electronic barrier on one surface of the wafer, thereby forming a diode having a depletion layer therein,
directing alternating current through the diode;
deriving from the diode first and second harmonic voltages of the applied alternating current;
and measuring the amplitude of the first and second harmonic voltages thereby to determine doping density as a function of distance.

5. The process of claim 4 further comprising the steps of:
applying a reverse-bias voltage to the diode, thereby expanding the depletion layer in the wafer;
and changing said reverse-bias voltage, whereby the depletion layer thickness changes, the amplitude of the first harmonic voltage is indicative of the depletion layer thickness and the amplitude of the second harmonic voltage is indicative of the doping density at the edge of the depletion layer.

6. The process of claim 5 wherein:
the alternating current directed through the diode is substantially constant.

7. Apparatus for evaluating semiconductor wafers which include a diode region comprising:
means for applying a reverse-bias voltage across the diode region thereby establishing a depletion layer;
means for applying alternating current of frequency $f$ to the diode region;
means for deriving a second harmonic voltage of frequency $2f$ through the diode region;
and means for measuring the amplitude of the second harmonic voltage, said amplitude being indicative of the doping density at an edge of the depletion layer.

8. The apparatus of claim 7 further comprising:
means for deriving a first harmonic voltage of frequency $f$ from the diode region;
and means for measuring the amplitude of the first harmonic voltage, said amplitude being indicative of the thickness of the depletion layer.

9. The apparatus of claim 8 further comprising:
means for changing the bias voltage across the diode region, thereby varying the thickness of the depletion layer;
and means for successively deriving and measuring the first and second harmonic voltages, thereby giving indications of the successive depletion layer thicknesses and doping density at different depths in the wafer.

10. The apparatus of claim 9 wherein:
the alternating current applying means comprises an input circuit having a much higher A-C impedance than the diode region at the frequency $f$, whereby the A-C current through the diode does not change substantially with bias voltage changes.

11. The apparatus of claim 9 wherein:

the alternating current applying means and the deriving means comprise circuitry connected to the diode region having an impedance seen by the diode region that may vary with frequency;

the impedance of said circuitry seen at the diode region at frequencies $f$ and $2f$ being much higher than the diode region impedance at frequencies $f$ and $2f$.

12. The apparatus of claim 10 wherein:

the input circuit comprises a first capacitance $C_1$ connected in parallel with a first inductance $L_1$, and a series-connected second capacitance $C_2$ and second inductance $L_2$ which are in parallel with the first capacitance, first inductance and the diode region;

said inductances and capacitances substantially comply with the relation, $$1/4 < L_1C_1/L_2C_2 < 4$$

13. The apparatus of claim 12 wherein said capacitances and inductances substantially comply with $$2\pi f = (L_1C_1L_2C_2/4)^{1/4}$$

14. The apparatus of claim 13 wherein said capacitances and inductances substantially comply with the relationships $$L_1C_1 = L_2C_2$$

$$C_1 = 2C_2$$

$$2\pi f = (2L_1C_1)^{-1/2}$$

15. The process for measuring the doping density profile of a semiconductor wafer comprising the steps of:

forming a diode comprising an electronic barrier on one surface of the wafer;

reverse-biasing the diode;

directing input alternating current energy of substantially constant current through the diode;

deriving output energy from the diode at first and second harmonic frequencies of the input energy;

and changing the reverse-bias while deriving the output energy thereby to determine doping density as a function of distance.

16. The process of claim 15 further comprising the steps of:

displaying the voltage amplitude of the second harmonic energy as a function of the voltage amplitude of the first harmonic output energy;

and calibrating the first harmonic voltage amplitude in terms of wafer depletion depth and the second harmonic voltage amplitude in terms of doping density at the edge of the depletion layer, whereby doping density as a function of distance is displayed.

17. Apparatus for measuring the doping density profile in a semiconductor wafer which includes on one surface a metal contact defining with the wafer a rectifying diode comprising:

means for applying a D-C bias across the diode to thereby form a depletion layer within the wafer;

means for applying a substantially constant alternating current to the diode;

means for changing the bias voltage;

and means for deriving output energy from the diode at first and second harmonic frequencies of the input alternating current thereby to determine doping density as a function of distance.

18. The apparatus of claim 17 further comprising:

means for measuring the voltage of the output energy at the first harmonic frequency;

and means for measuring the voltage of the output energy at the second harmonic frequency.

19. The apparatus of claim 17 further comprising:

an input circuit comprising a first capacitance $C_1$ connected in parallel with a first inductance $L_1$ and a series-connected second capacitance $C_2$ and second inductance $L_2$ which are in parallel with the first capacitance, the first inductance and the diode;

said inductances and capacitances substantially complying with the relation, $$1/4 < L_1C_1/L_2C_2 < 4$$

20. The apparatus of claim 19 wherein said inductances and capacitances substantially comply with the relation $$2\pi f = (L_1C_1L_2C_2/4)^{1/4}$$

21. The apparatus in claim 20 wherein said capacitances and inductances substantially comply with the relation $$L_1C_1 = L_2C_2$$

$$C_1 = 2C_2$$

$$2\pi f = (2L_1C_1)^{-1/2}$$

22. The apparatus of claim 18 wherein:

the first harmonic frequency voltage measuring means comprises display means in which the first harmonic frequency voltage is calibrated in terms of depletion layer thickness;

and the second harmonic frequency voltage measuring means comprises display means in which the second harmonic frequency voltage is calibrated in terms of doping density at the edge of the depletion layer.

23. The apparatus of claim 18 wherein: the diode is a Schottky barrier diode.

24. The apparatus of claim 18 wherein: the diode is a metal-insulator-semiconductor diode.

References Cited

UNITED STATES PATENTS 2,942,329 6/1960 Rutz ---------------- 29—574

RUDOLPH V. ROLINEC, Primary Examiner

E. L. STOLARUN, Assistant Examiner

U.S. Cl. X.R.

29—574, 593, 620; 324—57